Figure 1:
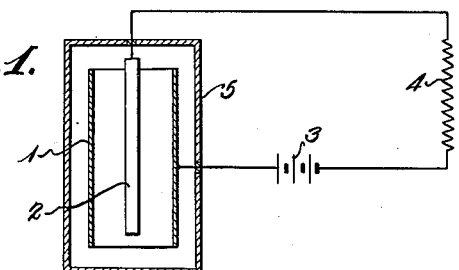

March 10, 1942.    R. E. FEARON    2,275,747
WELL SURVEY METHOD AND APPARATUS
Filed Dec. 27, 1939

Inventor
Robert E. Fearon
By Stevens and Davis
Attorneys

Patented Mar. 10, 1942

2,275,747

UNITED STATES PATENT OFFICE 2,275,747

WELL SURVEY METHOD AND APPARATUS

Robert Earl Fearon, Tulsa, Okla., assignor to Well Surveys, Incorporated, Tulsa, Okla., a corporation of Delaware Application December 27, 1939, Serial No. 311,217

18 Claims. (Cl. 250—83.6)

This invention relates to geophysical prospecting and particularly to a method and apparatus for accurately transmitting to the surface of the earth measurements made by an ionization chamber which is being raised or lowered in a well bore and which measurements represent the intensity of the radioactive radiations impinging upon it.

Previous to this invention it was known that valuable information about subsurface strata could be obtained by lowering an ionization chamber, such as a Geiger-Müller counter, into a well bore and recording its response to the radiations which it encountered at various depths. It is also known that the subsurface formations scatter or reflect radiations of the type generated by radioactive materials, X-ray tubes and the like and that the measurement of these scattered or reflected radiations may be used to determine the nature of and the interfaces between the various strata.

In operation, a Geiger-Müller counter or ionization chamber, which consists of a pair of spaced electrodes in a sealed chamber, is supplied with a potential across the electrodes and the rate of current flow or the number of pulses of current which flow between the electrodes is a measure of the intensity of the radiations that impinge upon it. In order to transmit to the surface of the earth measurements from a device of this type located in a well bore, it has been the practice to supply the electrodes with a potential while they are positioned within the well, to place in series with the source of potential and the electrodes a relatively high resistance and to use the potential drop across this resistance as a measure of the current flowing in the ionization chamber and hence as a measure of the effect of the radiations on the internal resistance of the ionization chamber which is in turn a measure of the intensity of the radiations.

In practice, the potential across the resistor in series with the ionization chamber is used to control an amplifier so that the output of the amplifier is indicative of the potential across the series resistor. A difficulty arose with this procedure, however, when an attempt was made to speed up the operation of the device by making measurements while the ionization chamber was being moved up and down in the well bore. Under these circumstances the potential across the series resistor does not at all times accurately correspond with the internal resistance of the ionization chamber, which is the measure of the intensity of the radiations impinging upon it.

The reason for this can be readily understood by an analysis of the situation. As has been said, the ionization chamber consists of two spaced electrodes. Between these electrodes there exists both capacity and resistance. The ionization chamber therefore may be considered to be a variable resistance in parallel with a fixed capacity. In series with these elements there will normally be a source of potential and the external fixed resistance. In order to obtain accurate measurements instantaneously, the instantaneous potential across the fixed resistance should at all times be proportional to the resistance of the ionization chamber.

Under any steady state of conditions, that is with the internal resistance of the ionization chamber remaining constant over a considerable period of time, a condition is reached where the potential across the ionization chamber and the internal resistance of the chamber bear a definite relation to each other so that the one may be used as a measure of the other because the capacity of the ionization chamber is fully charged for the potential across it and hence has no effect. However, when a change in the intensity of the impinging radiations takes place, due for example to a movement of the ionization chamber to a different position in the well bore, the internal resistance of the ionization chamber immediately changes but the potential across the chamber can only change as the capacity of the ionization chamber is charged or discharged so as to be satisfied at the new potential. There is for this reason a certain amount of lag between the time the circuit is at equilibrium under one intensity of radiations and the time it comes to equilibrium under a different intensity of radiations and this lag may be expressed by the formula $V_t = V\infty \{1 - e^{-t/RC}\}$ where $V_t$ is the voltage across the fixed resistor at any time $t$ after a change in the intensity of the radiations impinging upon the ionization chamber. $V\infty$ indicates the voltage that will eventually be developed across the fixed resistance if the conditions remain in their new state, $e$ is the base of natural logarithms, $t$ is the elapsed time since the change in intensity of radiations, R is the resistance of the fixed resistor and C is the capacity between the electrodes of the ionization chamber. As $t$ becomes infinity the quantity in the parenthesis becomes $(1-e^{-\infty})$ which is 1 and thus $V_t$ becomes $V\infty$. At any intermediate time the voltage $V_t$ is somewhere between the voltage before the change and the voltage that will eventually be reached and the curve along which this voltage changes depends, as can be seen from an inspection of the formula, upon the values for R and C, although it will always have the same general shape rising sharply in the beginning and then more slowly and finally reaching $V\infty$ only at an infinite time.

In practical experience it has been found that there is sufficient lag before $V_t$ becomes substantially $V\infty$ to cause the device to give inaccurate results if readings are taken while the device is being moved up and down in a well bore. Hence, it is the purpose of this invention to eliminate all or at least a sufficient amount of this lag so that the voltage across the fixed resistor can be used as a measure of the intensity of the radiations impinging on the ionization chamber even though the device is in a process of being moved up or down in a well bore.

To accomplish this object it has been found that if a derivative of the potential across the fixed resistor is taken and added to the potential itself, the result can be made to be substantially truly representative of the instantaneous resistance of the ionization chamber and hence of the intensity of the impinging radiations.

The reason for this is that when the resistance in the ionization chamber changes the potential across the fixed resistor immediately begins to change at a very rapid rate because all of the electrical pressure tending to change the state of the system is in effect and the capacity of the ionization chamber is being charged or discharged at a very rapid rate. This rate of change drops as the system comes nearer to equilibrium since the electrodes of the chamber are more nearly at their final potentials and more slowly absorb the charge. As a consequence if the derivative of the potential across the fixed resistor is taken it tends to be very large at the beginning due to the rapid change taking place and to drop off to zero at an infinite time. This is the exact complement of the change taking place in the actual potential across the fixed resistor and hence if the two are made to be of the proper comparative sizes and then added together, the result comes at least very near to being at any instant equal to the final voltage that will be developed across the fixed resistor. Thus by taking a derivative of the voltage across the resistor and adding it to the voltage itself a result is obtained which represents the instantaneous intensity of the impinging radiations with great accuracy.

Figure 2:
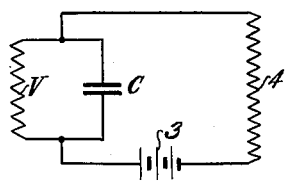
Figure 3:
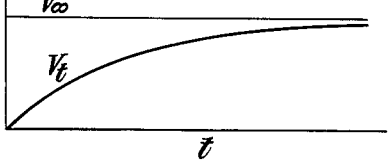
Figure 4:
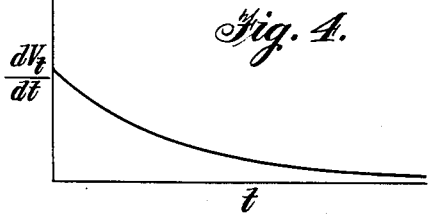
Figure 5:
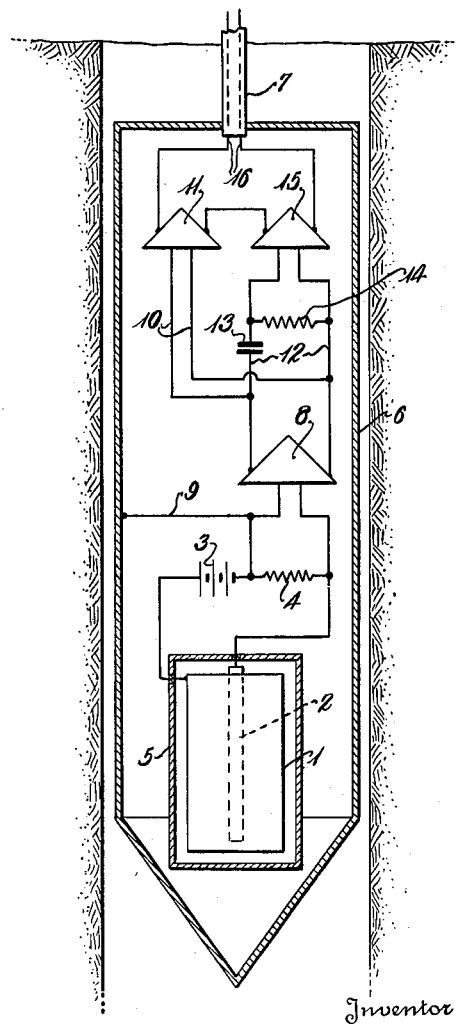

A more complete understanding of the many details and the advantages of this invention may be obtained by a consideration of the following detailed description of one embodiment thereof. In connection with this description reference will be had to the drawing in which Figure 1 diagrammatically illustrates the primary ionization chamber circuit; Figure 2 illustrates an equivalent circuit formed of simple electrical elements for the purpose of calculation; Figure 3 is a graphical representation of the voltage developed across the fixed resistor over a period of time beginning at the time of a change in internal resistance in the ionization chamber and compared with the voltage that will eventually be developed; Figure 4 illustrates graphically a derivative of the changing voltage over the same period of time; Figure 5 illustrates diagrammatically one embodiment of the principles of this invention in a device for practical use.

As illustrated in the drawing the primary ionization chamber circuit consists of an outer electrode 1 and an inner electrode 2, both positioned in an hermetically sealed compartment 5. A battery 3 is connected between the outer electrode and one end of a fixed resistor 4 usually having a resistance of around $10^{12}$ ohms. The other end of this resistor is connected to the central electrode 2. This much of the circuit is shown in Figure 1.

Converting the elements of Figure 1 into simple electrical elements for the purpose of analysis the circuit as shown in Figure 2 results. In this circuit the resistor 4 is connected to a variable resistance indicated as V and a fixed capacity indicated as C which are in parallel and these elements are connected through a battery 3, back to the other end of the fixed resistor. In simple electrical elements the ionization chamber consists of a variable resistance with a fixed capacity shunted across it as shown in this figure. The impinging radiations act to change the resistance and this results in the desired measurement.

Without the fixed capacity it is immediately apparent that any variation in the resistance of the variable resistance V would immediately result in a change in the potential developed across the fixed resistor 4 without any delay. It is also immediately apparent, however, that when the fixed capacity C is present there must be some lag in reaching equilibrium after any change in the resistance of the variable resistance V because it will take some time for current to flow through the resistance to satisfy the capacity at the changed potential. It is this lag that has been previously indicated by the formula $$V_t = V\infty \{1 - e^{-t/RC}\}$$

By application of this formula a curve of the type shown in Figure 3 may be obtained. This curve represents the values of $V_t$ for various values of $t$. As can be seen from Figure 3, upon changing the resistance of the ionization chamber the voltage across the fixed resistor changes, not instantaneously, but in accordance with the curve designated $V_t$ and approaches a new voltage which it will reach at an infinite time. This voltage is shown by a straight line designated $V\infty$ in Figure 3.

Now, according to this invention, if the voltage $V_t$ is derivated with respect to time, a voltage varying in relation to time as shown in the curve of Figure 4 is obtained. As can be readily seen if the voltage has the right relative magnitude and is added to the voltage $V_t$ a voltage results which is at least very close to $V\infty$ at all times.

The principles described may be incorporated in a practical device by placing the ionization chamber circuit and certain auxiliary devices in a casing adapted to be lowered into a well as illustrated in Figure 5, and connecting them through cables or the like to a recorder located on the surface.

In this figure the electrodes 1 and 2 of the ionization chamber are enclosed in a hermetically sealed compartment 5 and the whole positioned in a protecting shell 6 which is suspended by a cable 7 containing the necessary electrical connections to the surface of the ground. A battery 3 and a fixed resistor 4 are connected in series with the electrodes of the ionization chamber as shown in Figure 1, the battery preferably supplying about 150 volts of direct current potential and the resistor having a resistance of about $10^{12}$ ohms. The electrodes in the chamber 5 usually consist of a sheet iron cylindrical electrode 1 about two inches in diameter and six to eight inches long and a rod-like electrode 2 which is placed axially in the center thereof and which preferably also is made of iron. The chamber enclosing the electrodes is preferably filled with nitrogen under around 300 lbs. of pressure, although much lower pressures may be used if desired. Other gases may also be used. Preferably the end of the resistance 4 that is connected to the battery 3 is also grounded through a connection 9.

An amplifier 8 is connected across the resistor

4. The output of the amplifier 8 passes through leads 10 to an amplifier 11 and also through leads 12 to a condenser 13 and a resistor 14 connected in series. The capacitance of the condenser and the resistance of the resistor are both made quite small so that at the frequencies used the voltage drop across the condenser is far greater than across the resistor and results in a condition whereby the voltage across the resistor 14 is substantially proportional to the time derivative of the applied voltage. Another amplifier 15 is connected across this resistor 14 and the outputs of the two amplifiers 11 and 15 are connected in series and sent to the surface through leads 16 which pass into the cable 7. On the surface the resultant currents may be recorded and correlated with measurements of the depths at which they are taken in the usual manner.

This type of system may also be used in connection with a null system of measuring and recording in which the potential drop across the resistor 4 is balanced by the potential drop across a second resistor connected in series with it and supplied with current from the surface. Such a system is described in application by Serge A. Scherbatskoy, Serial Number 299,767, filed October 16, 1939, and entitled Well survey method and apparatus.

As another modification the measurements after having been derivated and combined may be converted into alternating currents and sent to the surface in the manner described in the application of Serge A. Scherbatskoy, Serial Number 279,577, filed June 16, 1939 and bearing the title Well logging by measurements of radioactivity.

Still other modifications will be apparent to those skilled in the art. The principles of this invention will doubtless also be applicable to other similar measurements and although it is the primary purpose of this invention to provide a method and means for making measurements of radioactivity the use of the principles of this invention for other purposes is within the scope of this invention insofar as it is included within the appended claims.

I claim:

1. In a method of geophysical exploration in which an ionization chamber is lowered into a drill hole to detect radioactive radiations which are indicated by time-lagging variations in the flow of electrical current therethrough, the steps of bringing a true indication of the current variations substantially free from time lag to recording equipment by taking from the ionization chamber circuit a voltage proportional to the flow of current through a resistance at least part of which is in that circuit, generating one current proportional to a time derivative of this voltage, generating a second current proportional to and having substantially the same time lag as the voltage itself, combining the two currents to produce a third current substantially free from time lag and conducting said third current to recording equipment.

2. In a method of geophysical exploration in which an ionization chamber is lowered into a drill hole to detect radioactive radiations which are indicated by time-lagging variations in the flow of electrical current therethrough, the steps of bringing a true indication of the current variations substantially free from time lag to recording equipment by taking from the ionization chamber circuit a voltage proportional to the flow of current through a resistance in that circuit, generating one current proportional to a time derivative of this voltage, generating a second current proportional to and having substantially the same time lag as the voltage itself, combining the two currents to produce a third current substantially free from time lag and conducting said third current to recording equipment.

3. In a device for geophysical prospecting in which an ionization chamber is lowered into a drill hole to detect radioactive radiations and in which the presence thereof is indicated by variations in current flow through the ionization chamber, apparatus for bringing to recorder equipment on the surface accurate indications of changes in current flow in the ionization chamber that comprises a resistance in the ionization chamber circuit, means to produce an electrical indication of a derivative of the voltage drop across said resistance, means to combine said electrical indication with an electrical indication of said voltage drop itself and means to convey said combined indications to the recording equipment.

4. In a device for geophysical prospecting in which an ionization chamber is lowered into a drill hole to detect radioactive radiations and in which the presence thereof is indicated by variations in current flow through the ionization chamber, apparatus for bringing to recorder equipment on the surface accurate indications of changes in current flow in the ionization chamber that comprises a resistance in said ionization chamber circuit, means to generate a current proportional to the time derivative of the voltage drop across the resistance, means to generate a current proportional to the voltage drop across said resistance, means to combine said currents and convey them to recorder equipment on the surface.

5. In a device for geophysical prospecting in which an ionization chamber is lowered into a drill hole to detect radioactive radiations and in which the presence thereof is indicated by variations in current flow through the ionization chamber, apparatus for bringing to recorder equipment on the surface accurate indications of changes in current flow in the ionization chamber that comprises a resistance in said ionization chamber circuit, an amplifier for generating a current proportional to the voltage drop across said resistance, a second amplifier for generating a current proportional to a time derivative of the current generated by said first amplifier, a third amplifier for generating a current proportional to the current generated by said first amplifier and means for combining the output currents of the said second and third amplifiers and conveying the combined current to a recorder.

6. In a device for geophysical prospecting in which an ionization chamber is lowered into a drill hole to detect radioactive radiations and in which the presence thereof is indicated by variations in current flow through the ionization chamber, apparatus for bringing to recorder equipment on the surface accurate indications of changes in current flow in the ionization chamber that comprises a resistance in said ionization chamber circuit, an amplifier with its input connected across said resistance, a second amplifier with its input connected through a derivating circuit to the output of said first amplifier, a third amplifier with its input connected directly to the output of said first amplifier and means connecting the outputs of said second and third amplifiers in series and to recording equipment.

7. In a device for geophysical prospecting in which an ionization chamber is lowered into a drill hole to detect radioactive radiations and in which the presence thereof is indicated by variations in current flow through the ionization chamber, apparatus for bringing to recorder equipment on the surface accurate indications of changes in current flow in the ionization chamber that comprises a resistance in series with said ionization chamber, an amplifier the input of which is connected across said resistance, a small condenser and a low resistance connected in series across the output of said amplifier, a second amplifier the input of which is connected across said small resistance, a third amplifier the input of which is connected directly across the output of said first amplifier and means connecting the outputs of said second and third amplifiers in series and to recording equipment.

8. In combination with a geophysical exploration instrument of the type including an ionization chamber through which a first current flows to a degree proportional to the intensity of radioactive radiation impinging upon the chamber, a derivator for substantially compensating for time-lag in said first current yielding a second current related to the first current as the time derivative thereof, and means for combining the first and second currents to yield a third current corresponding to the first current but substantially free from time-lag.

9. In a geophysical exploration device of the type including a chamber within which are mounted differentially charged plates in a medium ionized by radioactive radiation whereby a current flows between the plates, the current flow being characterized in lagging for a time interval subsequent to ionization of the medium before gradually reaching maximum value, the improvements which comprise means for forming a second current related to the first current flowing between the plates having an initial value substantially equal to the maximum value of the first current and thereafter diminishing in value in degree and at the same rate as the first current increases in value, and means for combining said first and second currents to produce a third current of constant value, related to ionization of the medium but substantially free from time-lag.

10. In a geophysical exploration device of the type comprising a radioactive-radiation-sensing ionization chamber through which a first current flows to a degree varying with the radiation, means for substantially compensating for time-lag in variation of said first current comprising a derivator creating a second current related to the first current as the time-derivative thereof, and means for creating a third current substantially free from time lag by combination of said first and second currents.

11. In methods of geophysical exploration using a radioactive-radiation-sensing device of the type including an ionization chamber through which a first current flows to a degree related to the intensity of the radiation, the method of substantially compensating for time-lag in the flow of said first current which comprises creating a second current related to the first current as the time derivative thereof, and combining said first and second currents to produce a third current having a magnitude equal to the maximum magnitude of the first current but substantially free from time-lag.

12. Method of substantially compensating for time lag of current change in an ionization chamber of the type used in geophysical prospecting which comprises forming a second current related to the current in the ionization chamber as the time derivative thereof, and combining the currents to produce a third current related in magnitude to the current in the chamber but substantially free from time-lag.

13. In combination with a geophysical exploration instrument of the type which includes a device for producing a measurement of radiation emanating from subsurface strata, means for translating the measurement into a proportionally related first electrical current, and means for creating a second electrical current substantially free from time lag related to the first current as the time derivative thereof.

14. In combination with a geophysical exploration instrument of the type which includes a device for producing a measurement of radiation emanating from subsurface strata, means for translating the measurement into a proportionally related first electrical current, means for creating a second electrical current related to the first current as the time derivative thereof, and means for combining the first and second currents to yield a third current substantially free from time lag.

15. In a geophysical exploration device of the type including measuring means responsive to radiation emanating from geological formations under observation, current creating means for producing a first electrical current varying proportionally to measurements made by said measuring means, a derivator for producing a second electrical current related to the first current as the time derivative thereof, and means for creating a third current substantially free from time lag by combination of said first and second currents.

16. In a geophysical exploration device of the type including a measuring instrument for gauging changes in radiation emanating from geological formations; means for creating a first current, proportionally related in magnitude to measurements obtained by said instrument but characterized by initially lagging a time interval subsequent to the instant of measurement before reaching maximum magnitude; the improvements which comprise means for forming a second current substantially free from time lag having an initial magnitude substantially corresponding to the maximum magnitude of the first current but thereafter diminishing in magnitude in degree and at the same rate as the first current increases in magnitude.

17. In combination with a geophysical exploration instrument of the type including a radiation detector and means to translate detections of said detector into a first electrical current having a characteristic time lag, means for providing a signal current substantially free from time lag that comprises a derivator for producing a second current related to the first current as the time derivative thereof.

18. Method of substantially compensating for time lag in the signal current from a geophysical exploration instrument of the type including a radiation detector that comprises passing the signal current to an electrical derivator to produce an electrical current related to the signal current as the time derivative thereof.

ROBERT EARL FEARON.